US011539810B1

(12) United States Patent
Jaiswal et al.

(10) Patent No.: US 11,539,810 B1
(45) Date of Patent: Dec. 27, 2022

(54) DATA STREAM MANAGEMENT

(71) Applicant: INTERNATIONAL BUSINESS MACHINES CORPORATION, Armonk, NY (US)

(72) Inventors: Peeyush Jaiswal, Boca Raton, FL (US); Priyansh Jaiswal, Boca Raton, FL (US); Paul Llamas Virgen, Zapopan (MX)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/663,481

(22) Filed: May 16, 2022

(51) Int. Cl.
| | | |
|---|---|---|
| *H04L 29/08* | (2006.01) | |
| *H04L 12/24* | (2006.01) | |
| *H04L 67/1042* | (2022.01) | |
| *H04L 67/562* | (2022.01) | |
| *H04L 65/60* | (2022.01) | |
| *H04L 67/10* | (2022.01) | |

(52) U.S. Cl.
CPC .......... *H04L 67/562* (2022.05); *H04L 65/60* (2013.01); *H04L 67/10* (2013.01)

(58) Field of Classification Search
USPC ........................................................ 709/203
See application file for complete search history.

(56) References Cited

U.S. PATENT DOCUMENTS

| | | | |
|---|---|---|---|
| 10,200,350 B2 | 2/2019 | Liu | |
| 10,346,303 B1 * | 7/2019 | Abrahms | ............ G06F 12/0804 |
| 10,397,376 B2 | 8/2019 | Phillips | |
| 10,433,021 B2 | 10/2019 | Christoph | |
| 10,575,050 B2 | 2/2020 | Occhialini | |
| 10,891,308 B2 * | 1/2021 | Chen | ................... G06F 11/1484 |
| 10,958,703 B2 | 3/2021 | Gyimesi | |
| 2017/0085637 A1 * | 3/2017 | Cencini | ................. G06F 15/161 |
| 2018/0006870 A1 * | 1/2018 | McChord | ............ H04L 41/0806 |

(Continued)

FOREIGN PATENT DOCUMENTS

CN 105872587 A 8/2016

OTHER PUBLICATIONS

IBM Cloud, "Content Delivery Network", https://cloud.ibm.com/catalog/infrastructure/content-delivery-network, accessed Feb. 18, 2022, pp. 1-3.

(Continued)

*Primary Examiner* — Jude Jean Gilles
(74) *Attorney, Agent, or Firm* — Tihon Poltavets

(57) ABSTRACT

A method for managing data streams for similar content on multiple client devices includes receiving a new request for content from a server provider. In response to determining there is an existing request associated with an existing data stream for the content from the server provider, the method includes blocking the new request. The method also includes receiving the existing data stream from the service provider for the content via an external network and performing a stream computation for the existing data stream to provide a first data stream for the existing request for the content and a second data stream for the new request for the content. The method also includes sending the first data stream for the existing request for the content to a first client device and the second data stream for the new request for the content to a second client device, via a local network.

20 Claims, 7 Drawing Sheets

(56) References Cited

U.S. PATENT DOCUMENTS

| | | | |
|---|---|---|---|
| 2018/0227240 A1* | 8/2018 | Liu | G06F 9/505 |
| 2019/0327125 A1* | 10/2019 | McChord | G06F 11/3006 |
| 2020/0127897 A1* | 4/2020 | Shultz | H04L 41/0893 |
| 2020/0336475 A1* | 10/2020 | Padmanabhan | H04L 63/0428 |
| 2021/0029622 A1* | 1/2021 | Höhne | H04W 48/20 |
| 2021/0336891 A1 | 10/2021 | Lawrence | |

OTHER PUBLICATIONS

IBM, Content Delivery Networks (CDNs), https://www.ibm.com/cloud/learn/content-delivery-networks, Dec. 23, 2020, pp. 12.

IBM,"IBM Video Streaming", https://www.ibm.com/products/video-streaming, accessed Feb. 18, 2022, pas 1-5.

Mell et al., "The NIST Definition of Cloud Computing", National Institute of Standards and Technology, Special Publication 800-145, Sep. 2011, pp. 1-7.

\* cited by examiner

DATA STREAM MANAGEMENT

BACKGROUND

This disclosure relates generally to managing data streams, and in particular to managing data streams for similar content on multiple client devices.

A content delivery network, often referred to as a content distribution network (CDN), is a distributed network of proxy server and associated data centers based on geographical locations. CDNs accelerate access to web content for a device associated with a user by placing distribution servers closer to a location of the device and reducing latency as the user attempts to access a webpage or stream content on the device. Typically, it is common to have multiple users with multiple associated devices consuming similar web content through the CDN, ranging from a professional web conference to a live stream of an event. The similar web content is delivered to the multiple associated devices through multiple streams, increasing network traffic in the delivery of the web content to the multiple users.

SUMMARY

Embodiments in accordance with the present invention disclose a method, computer program product and computer system for managing data streams for similar content on multiple client devices, the method, computer program product and computer system can receive a new request for content from a server provider. The method, computer program product and computer system can, responsive to determining there is an existing request associated with an existing data stream for the content from the server provider, block the new request for the content from the service provider. The method, computer program product and computer system can receive the existing data stream from the service provider for the content via an external network. The method, computer program product and computer system can perform a stream computation for the existing data stream to provide a first data stream for the existing request for the content and a second data stream for the new request for the content. The method, computer program product and computer system can send the first data stream for the existing request for the content to a first client device and the second data stream for the new request for the content to a second client device, via a local network.

DETAILED DESCRIPTION

Embodiments of the present invention manage data streams for similar content on multiple client devices by consolidating multiple data streams on an external network into a single data stream. Utilizing a request handling device as an intermediate device for content request allows for the analyzing of requests for content and identifying of similar requests for content for which data streams can be merged. Provided advantages of the embodiments of the present invention include bandwidth conservation and reduced latency, which refers to the delay between the time data is requested from a system and when the system starts sending the response. By utilizing a single data stream for multiple data streams via a local content delivery network, a distance between a client device and the web content is reduced with the utilization of a request handling device. Another provided advantage of the embodiments of the present includes increased response to traffic spikes, where the request handling device locally handles a distribution of high traffic web content (e.g., livestream of a breaking news story). Yet another provided advantage of the embodiments of the present invention includes improved content delivery by allowing for the content delivery network to provide a single reliable stream of content to multiple client devices via the request handling device.

Embodiments of the present invention create a trusted environment where the end points enable device discoverability by utilizing a plurality of encrypted key in the trusted environment, behind the device. For instances where data streams are not synced, embodiments of the present invention perform a stream computation to identify where overlapping and merging of data streams can occur.

Figure 1:
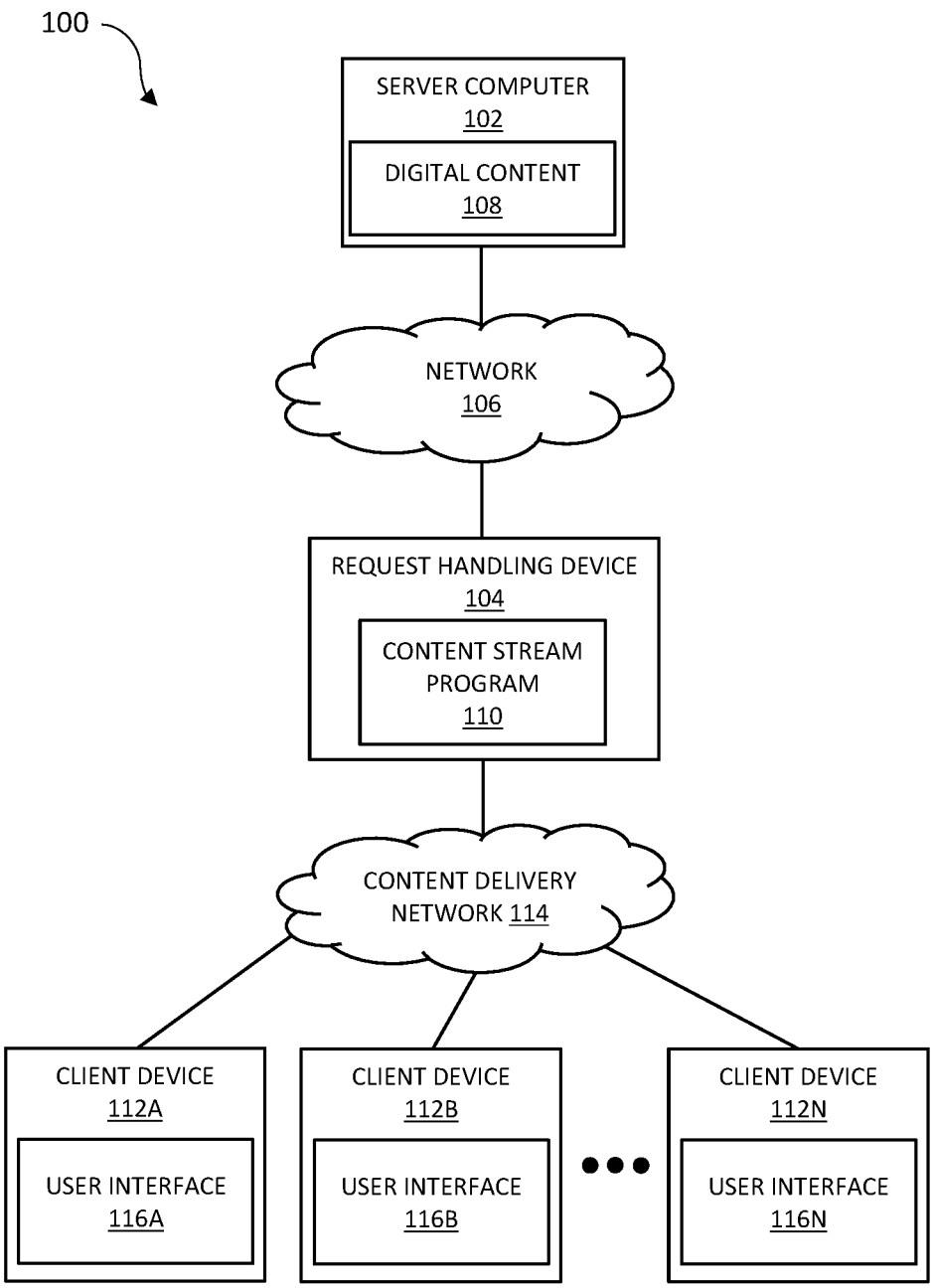
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes server computer 102 and request handling device 104 interconnected over network 106. Furthermore, distributed data processing environment 100 includes request handling device 104 and client device 112A, 112B, and 112N representing the $n^{th}$ client device (e.g., $10^{th}$) all interconnected over content delivery network 114.

Server computer 102 can be a standalone computing device, a management server, a web server, or any other electronic device or computing system capable of receiving, sending, and processing data. In one embodiment, server computer 102 represent a server computing system utilizing multiple computers as a server system, such as in a cloud computing environment. In another embodiment, server computer 102 represents a computing system utilizing clustered computers and components (e.g., database server computers, application server computers, etc.) that act as a single pool of seamless resources when accessed within the distributed data processing environment. Server computer 102 includes digital content 108 for streaming to client device 112A, 112B, and 112N via network 106 and an intermediate device (i.e., request handling device 104). In this embodiment, server computer 102 and request handling device 104 are owned by a single entity, such as, a digital content provider. Examples of a digital content provider can include but are not limited to a media (e.g., music, video) stream provider or a videotelephony provider (e.g., online meetings). In other embodiments, server computer 102 and request handling device 104 are the same device that includes digital content 108 and content stream program 110 for providing content to client device 112A, 112B, and 112N via content delivery network 114.

Request handling device 104 can be a standalone local computing device, a local management server, a local web server, a mobile computing device or any programmable electronic device capable of communicating with server computer 102 via network 106. Request handling device 104 also communicates with client device 112A, 112B, 112N, and other computing devices (not shown) within the distributed data processing environment via content delivery network 114. Request handling device 104 includes content stream program 110 for managing content requests from client device 112A, 112B, and 112N, and performing stream computations for consolidating multiple streams for similar content to client device 112A, 112B, and 112N. Request handling device 104 acts as intermediate device for digital content 108 being streamed from server computer 102 to client device 112A, 112B, and 112N via network 106 and content delivery network 114.

Network 106 and content delivery network 114 can each be, for example, a telecommunications network, a local area network (LAN), a wide area network (WAN), such as the Internet, or a combination of the three, and can include wired, wireless, or fiber optic connections. Network 106 and content delivery network 114 can each include one or more wired and/or wireless networks capable of receiving and transmitting data, voice, and/or video signals, including multimedia signals that include voice, data, and video information. In general, network 106 can be any combination of connections and protocols that will support communications between server computer 102, request handling device 104, and other computing devices (not shown) within the distributed data processing environment. Content delivery network 114 can be any combination of connections and protocols that will support communications between server request handling device 104, client device 112A, 112B, 112N, and other computing devices (not shown) within the distributed data processing environment.

Content stream program 110 manages data streams for similar digital content 108 from server computer 102 to client device 112A, 112B, and 112N by overlapping common stream area and merging data streams to reduce network latency. For handling outgoing data requests, content stream program 110 receives a request for content from a client device (e.g., client device 112A) via content delivery network 114 and determines whether to analyze the request for the content based on one or more security and/or privacy considerations. In the event content stream program 110 determines not to analyze the request for the content, content stream program 110 sends the request to the content provider (i.e., server computer 102) via network 106. In the event content stream program 110 determines to analyze the request for the content, content stream program 110 analyzes the request for content to determine whether there is a similar request for content from another client device (e.g., client device 112B). In the event content stream program 110 determines there is no similar request for content, content stream program 110 sends the request to the content provider (i.e., server computer 102) via network 106. In the event content stream program 110 determines there is a similar request for content, content stream program 110 blocks the request for the content, since the request for the content already exist for the original client device (i.e., client device 112A).

For handling incoming data streams, content stream program 110 receives the requested content from the content provided (i.e., digital content 108 from server computer 102) and determines whether there were multiple requests from multiple client devices (e.g., client device 112A, 112B, and 112N) for the received requested content. In the event content stream program 110 determines there were no multiple requests from multiple client devices for the received requested content, content stream program 110 sends the requested content to the single client device (e.g., client device 112A). In the event content stream program 110 determines there were multiple requests from multiple client devices for the received requested content, content stream program 110 performs a data stream computation for the requested content to provide a data stream to each of the multiple client devices for the requested content. Content stream program 110 sends the requested content to the multiple client devices based on the data stream computation.

User interface 116A, 116B, and 116N representing the $n^{th}$ user interface (e.g., $10^{th}$) on client device 112A, 112B, and 112N enables a user to make requests of or issue commands to request handling device 104 via content delivery network 114. User interface 116A, 116B, and 116N each enable the user to receive information and instructions in response on originating client device 112A, 112B, and 112N, respectively. In one embodiment, a user for each of client devices 112A, 112B, and 112N accesses respective user interface 116A, 116B, and 116N via voice commands in natural language. In one embodiment, user interface 116A, 116B, and 116N can each be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 116A, 116B, and 116N enables each user of client device 112A, 112B, and 112N to interact with content stream program 110 on request handling device 104.

Figure 2:
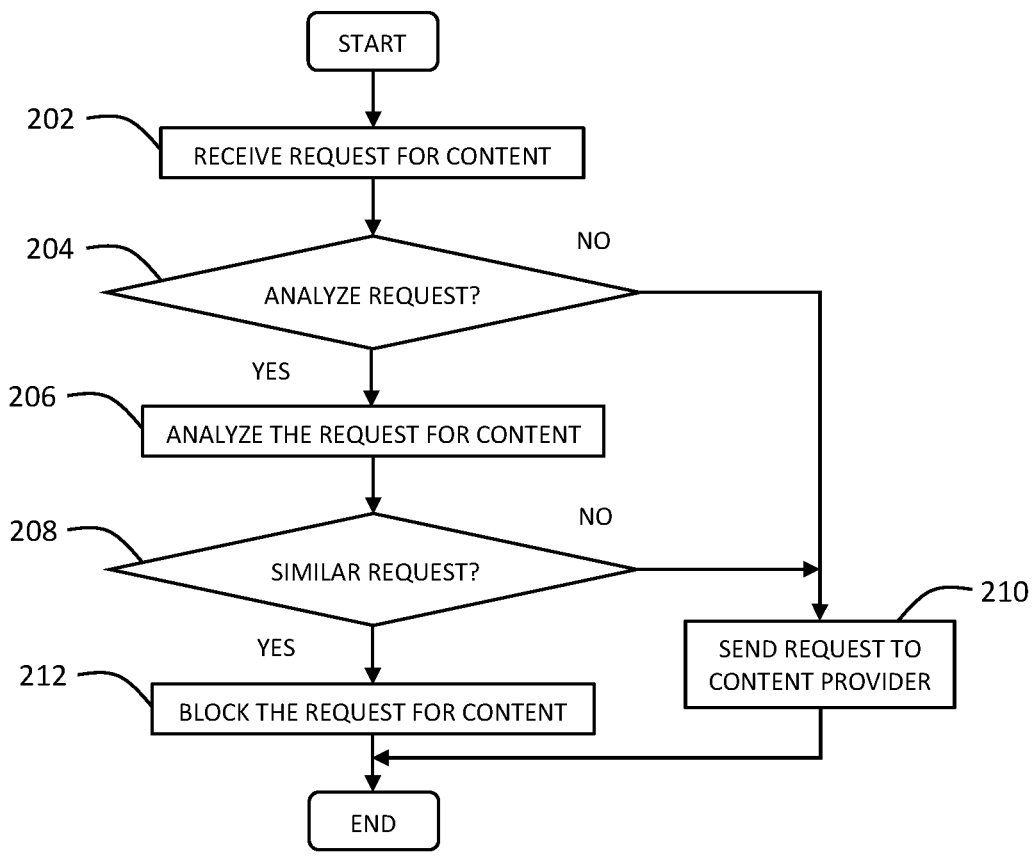
FIG. 2 depicts a flowchart for a content stream program for managing requests for content, in accordance with an embodiment of the present invention.

FIG. 2 depicts a flowchart for a content stream program for managing requests for content, in accordance with an embodiment of the present invention.

Content stream program 110 receives a request for content (202). Content stream program 110 processes requests for content from multiple client device in a specific geographical location, such as, an office building or private residency area. In one embodiment, content stream program 110 receives a request for content from a client device at a request handling device, where the request for content is directed to a content provider. In another embodiment, content stream program 110 receives a request for content from a client device at a server computer associated with the content provider hosting the requested content. Examples of a content provider include but are not limited to an audio streaming service, a video streaming service, and a videotelephony service.

Content stream program 110 determines whether to analyze the request for content (decision 204). Content stream program 110 includes security considerations to determine whether to analyze the request for content. Content stream program 110 allows for each user associated with a client device to establish rules and preferences by selecting what types of content that content stream program 110 can analyze to determine if multiple streams for similar content exists. In one example, content stream program 110 establishes user provided rules and preferences for a user that allows analysis of content from a video streaming service (e.g., movie or live sporting event) but restricts content stream program 110 access to a videotelephony service (e.g., web conference). In the event content stream program 110 determines to analyze the request for content ("yes" branch, decision 204), content stream program 110 analyzes the request for the content (206). In the event content stream program 110 determines to not analyze the request for the content ("no" branch, decision 206), content stream program 110 sends the request to the content provider (210).

Content stream program 110 analyzes the request for the content (206). Content stream program 110 analyzes the request for the content by identifying a client device associated with the request, a type of content associated with the request, and a content provider associated with the request. In one example, content stream program 110 analyzes the request for the content and identifies a client device as a laptop computer, a location for the client device as an office building, a type of content associated with the request as a web conference, and videotelephony service A as the content provider associated with the request. Furthermore, content stream program 110 determines the web conference is yet to being and there are thirty other users who are expected to attend the web conference based on an attendee list. In another example, content stream program 110 analyzes the request for the content and identifies a client device as a tablet computer, a location for the client device as a personal residence, a type of content associated with the request as a livestream of a sporting event, and video streaming service A as the content provider associated with the request. Furthermore, content stream program 110 determines the livestream from video streaming service A has already begun and based on the analysis, the request for the content is for the livestream from a starting point (e.g., minus 15 minutes) versus a current point in the livestream.

Content stream program 110 determines whether a similar request is present for the content (decision 208). In the event content stream program 110 determines there is no similar request present for the content ("no" branch, decision 208), content stream program 110 sends the request to the content provider (210). In the event content stream program 110 determines there is a similar request present for the content ("yes" branch, decision 208), content stream program 110 blocks the request for the content (212). In the example where the request for the content is for a web conference, content stream program 110 determines there are other similar requests present for the content based on the attendee list and another request for the similar content (i.e., web conference) previously received by content stream program 110. In the example where the request for the content is for a livestream of a sporting event, content stream program 110 determines there were previous requests for the livestream of the sporting event for which a merging of data streams is possible.

Figure 3:
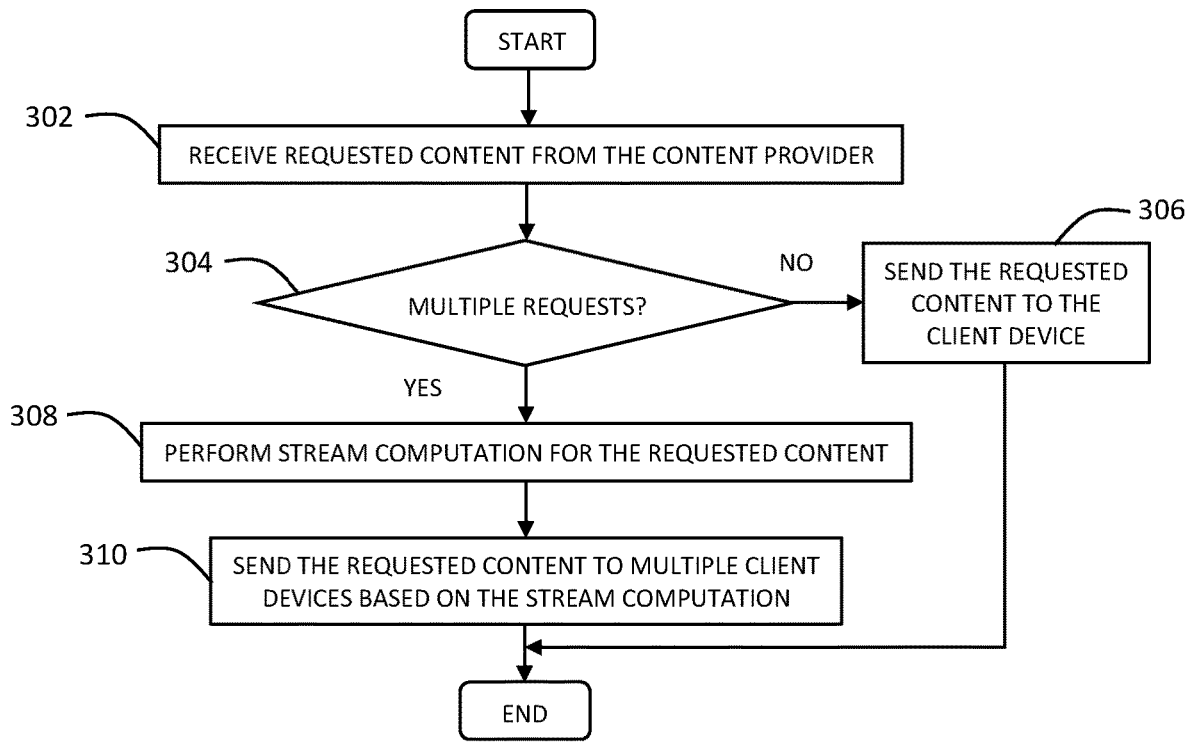
FIG. 3 depicts a flowchart for a content stream program for performing a stream computation for multiple requests for similar content, in accordance with an embodiment of the present invention.

FIG. 3 depicts a flowchart for a content stream program for performing a stream computation for multiple requests for similar content, in accordance with an embodiment of the present invention.

Content stream program 110 receives requested content from the content provider (302). In one embodiment, content stream program 110 receives the requested content from the content provider, where content stream program 110 previously did not analyze the request due to security considerations with rules and preferences previously established by the user of the client device attempting to stream the requested content. In another embodiment, content stream program 110 receives the requested content from the content provider, where content stream program 110 previously determined there were no similar requests for the requested content. Content stream program 110 receives the requested content from the service provider via a network and can subsequently distribute the requested content to multiple client device via a local content delivery network. In one example, the requested content is a corporate presentation that was previously recorded but was being released at specific time. In another example, the requested content is a livestream of a videotelephony based web conference. In yet another example, the requested content is a livestream of a sporting event. It is to be noted, content stream program 110 receiving requested content from the content provider can represent a continuous data stream containing the requested content (e.g., video stream, audio stream) or can represent a data stream for transferring a fixed amount data for the requested content (e.g., video file, audio file).

Content stream program 110 determines whether there were multiple requests for the received requested content (decision 304). Content stream program 110 determines whether there were multiple requests from multiple client devices associated with multiple users for the received requested content. In the event content stream program 110 determines there were not multiple requests for the received requested content ("no" branch, decision 304), content stream program 110 sends the requested content to the client device (306). In the event content stream program 110 determines there were multiple requests for the received requested content ("yes" branch, decision 304), content stream program 110 performs a stream computation for the requested content (308).

In one example, content stream program 110 continuously receives a data stream for the requested content, where the requested content is a video stream for a web conference being provided by videotelephony service A. Content stream program 110 determines there were multiple requests for the requested content, where user A initializes a web conference by being the first participant to join via a local network (i.e., content delivery network) and user B subsequently joins the web conference as the second participant after a period of time (e.g., 30 seconds) via the local network. In another example, content stream program 110 continuously receives a data stream for the requested content, where the requested content is a livestream for a sporting event being provided by video streaming service A. Content stream program 110 determines there were multiple requests for the requested content, where user A initialized the livestream on a smartphone connected to a local network (i.e., content delivery network) and user B subsequently attempts to access the livestream on a tablet computer connected to the same local network. In yet another example, content stream program 110 determines there were no multiple requests for the requested content, where user A initializes a livestream for a sporting event on a smartphone with no other user on the local network attempting to access the requested content.

Content stream program 110 sends the requested content to the client device (306). Content stream program 110 sends the requested content to the client device as a continuous data stream from the service provider via a wider internet network and to the client device via a local network. In one example, content stream program 110 sends the requested content to the client device as a continuous data stream, where the requested content is a video stream for a web conference being provided by videotelephony service A. User A initializes a web conference by being the first participant to join via a local network and content stream program 110 establishes the data stream for the web conference by sending the requested content to a client device of user A. However, if another user, such as, user B subsequently joins the web conference as the second participant after a period of time (e.g., 30 seconds), content stream program 110 performs a stream computation to maintain a single stream from videotelephony service A (i.e., the service provider) via the external network and sends two streams to the two client devices of user A and user B based on the stream computation. In another example, content stream program 110 sends the requested content to the client device as a continuous data stream, where the requested content is a video stream for a livestreamed sports event being provided by video streaming service A. User A initializes a livestream of the sporting event by being the first user access the content via a local network and content stream program 110 establishes the data stream for the livestream of the sporting event by sending the requested content to a client device of user A. However, if another user, such as, user B subsequently attempts to access the same livestream of the sporting event on another client device, content stream program 110 performs a stream computation to maintain a single stream from video streaming service A (i.e., the service provider) via the external network and sends two streams to the two client devices of user A and user B based on the stream computation.

Content stream program 110 performs a stream computation for the requested content (308). In addition to managing content requests, content stream program 110 tracks of a progress for each of the content requests by utilizing URL with metadata and/or packetized content checksums. From a previously discussed example, content stream program 110 continuously receives a data stream for the requested content, where the requested content is a video stream for a web conference being provided by videotelephony service A. Content stream program 110 determines there were multiple requests for the requested content, where user A initializes a web conference by being the first participant to join via a local network (i.e., content delivery network) and user B subsequently joins the web conference as the second participant after a period of time (e.g., 30 seconds) via the local network. Content stream program 110 performs a stream computation to determine where an overlapping and merging of a data stream for user A and user B can occur. Since the web conference is a continuous live data stream, the data stream overlapping occurs at the point when user B joins the web conference. As a result, content stream program 110 maintains a single stream from the service provider via the external network and sends two streams to the two client devices of user A and user B based on the stream computation.

From another previously discussed example, content stream program 110 continuously receives a data stream for the requested content, where the requested content is a livestream for a sporting event being provided by video streaming service A. Content stream program 110 determines there were multiple requests for the requested content, where user A initialized the livestream on a smartphone connected to a local network (i.e., content delivery network) and user B subsequently attempts to access the livestream on a tablet computer connected to the same local network. Content stream program 110 performs a stream computation to determine where an overlapping and merging of a data stream for user A and user B can occur. Since the livestream of the sporting event is a continuous live data stream via a first stream for user A, the data stream overlapping occurs at the point when user B accesses the live stream. However, user B has selected to view the live stream from the beginning (i.e., time −15 minutes) versus viewing the live stream at a current position (i.e., time 0 minutes). As a result, content stream program 110 establishes a second stream with the content provider for the portion of the live stream missed by user B (i.e., 15 minutes) and severs the second stream once a position (i.e., time 0 minutes) overlaps with the first data stream that was being utilized by user A. A visual representation of the stream computation and associated discuss is provided with respect to FIGS. 4A, 4B, and 4C.

Content stream program 110 sends the requested content to the multiple client devices based on the stream computation (310). Content stream program 110 sends the requested content received from the service provider via the external network to each of the multiple client devices via a local content delivery network. From a previously discussed example, content stream program 110 continuously receives a data stream for the requested content, where the requested content is a video stream for a web conference being provided by videotelephony service. Content stream program 110 maintains a single stream from the service provider via the external network and sends two streams to the two client devices of user A and user B based on the stream computation. Content stream program 110 sends the requested content to user A upon initializing the web conference and as user B joins the web conference after a period of time, content stream program 110 sends the requested content to user B without establishing another stream with the service provider. From another previously discussed example, content stream program 110 continuously receives a data stream for the requested content, where the requested content is a livestream for a sporting event being provided by video streaming service A. Content stream program 110 maintains two streams from the service provider via the external network and sends two streams for the livestream sporting event to the two client device of user A and user B, until the stream for user B reaches a point on the stream for user A when user B began watching the livestream. At which point, content stream program 110 severs the stream with the service provider for user B and utilizes the stream with the service provider for user A to view the remaining content.

Figure 4A:
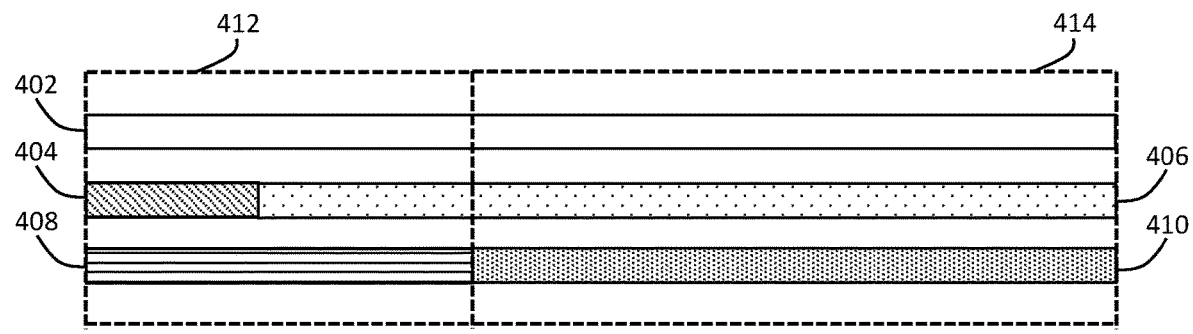
FIG. 4A illustrates an example of a content stream program with three separate streams for similar content on three client devices, in accordance with an embodiment of the present invention.

FIG. 4A illustrates an example of a content stream program with three separate streams for similar content on three client devices, in accordance with an embodiment of the present invention. In this example, content stream program 110 receives three separate requests for similar content from three client device connected to local content delivery network. For a first stream, area 402 represents content to be viewed by a first user on a first client device, where the first user is to view the content from an initial point. For example, the first user can initialize the first stream by initializing a web conference being provided by videotelephony service. In another example, the first user can initialize the first stream by initializing a livestream of a sporting event being provided by video streaming service. For a second stream, area 404 represents a duration for a period of time between the request for content between the first user and a second user (e.g., 2 minutes). Area 406 of the second stream represents content to be viewed by the second user on a second client device, where the second user is to view the content from a point after area 404. For a third stream, area 408 represents a duration for period of time between the request for content between the first user and a third user (e.g., 5 minutes). Area 410 of the third stream represents content to be viewed by the third user on a third client device, where the second user is to view the content from a point after area 408. Content stream program 110 determines that common area 414 for the first stream, the second stream, and the third stream includes overlapping streams for the similar content that can be merged into one data stream, thus reducing the total number of streams from the service provider by two streams. Content stream program 110 performs stream computations for the first stream, the second stream, and the third stream in computational area 412 due to partial overlapping streams for the similar content that can be merged over time into one data stream from the service provider.

Figure 4B:
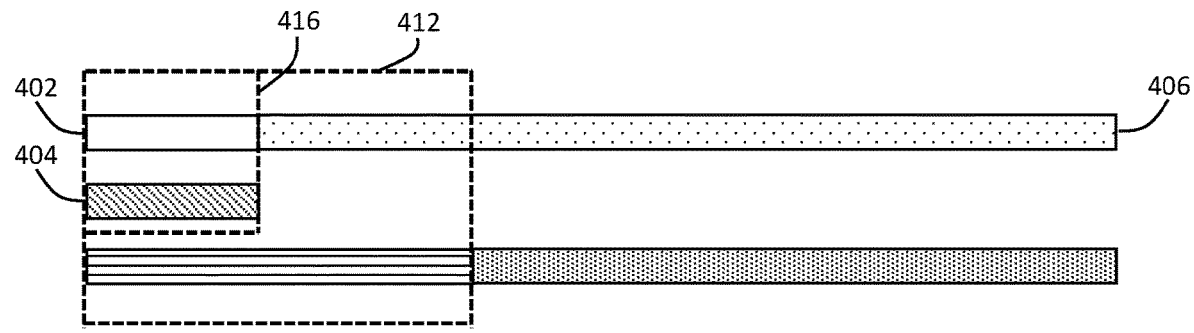
FIG. 4B illustrates an example of a content stream program with two separate streams for similar content on three client devices after a first stream computation, in accordance with an embodiment of the present invention.

FIG. 4B illustrates an example of a content stream program with two separate streams for similar content on three client devices after a first stream computation, in accordance with an embodiment of the present invention. Content stream program 110 performs a first stream computation on first computational subarea 416 of computational area 412, where content stream program 110 determines that area 406 is shared between the first stream and the second stream. Therefore, content stream program 110 can utilize a single data stream from the service provider for area 406 shared between the first stream for the first user and the second stream for the second user. In this example, the second user is accessing the similar content for a duration associated with a period of time (e.g., 2 minutes) represented by area 404 after the first user already accessed the content. Content stream program 110 utilizes the single data stream from the service provider for both requests for the similar content by the first user and the second user.

Figure 4C:
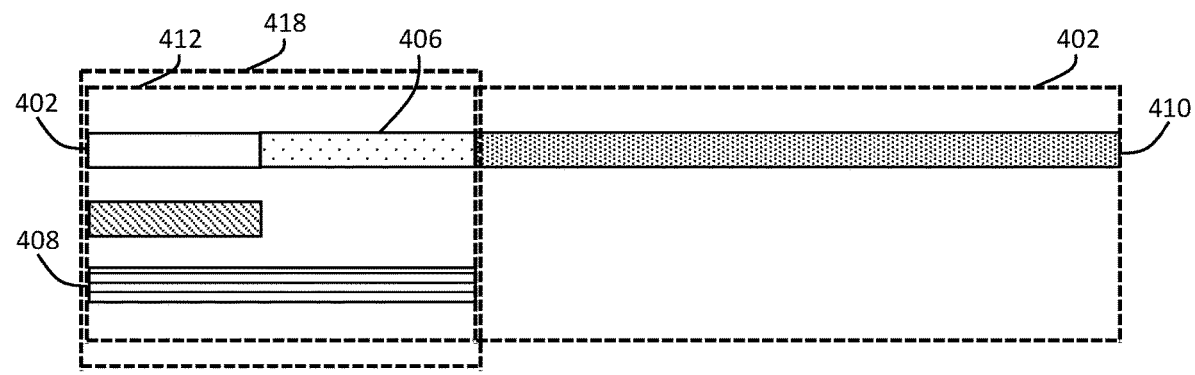
FIG. 4C illustrates an example of a content stream program with a single stream for similar content on three client devices after a second stream computation, in accordance with an embodiment of the present invention.

FIG. 4C illustrates an example of a content stream program with a single stream for similar content on three client devices after a second stream computation, in accordance with an embodiment of the present invention. Content stream program 110 performs a second stream computation on second computational subarea 418 of computational area 412, where content stream program 110 determines that area 410 is shared between the first stream, the second stream, and the third stream. Therefore, content stream program 110 can utilize a single data stream from the service provider for area 410 shared between the first stream for the first user, the second stream for the second user, and the third stream for the third user. In this example, the third user is accessing the similar content for a duration associated with a period of time (e.g., 5 minutes) represented by area 408 after the first user already accessed the content. Content stream program 110 utilizes the single data stream from the service provider for the three requests for the similar content by the first user, the second user, and the third user. In summary, the first stream with area 402 provides the stream to the first client device associated with the first user, the first stream with area 406 provides the stream to the first client device associated with the first user and the second client device associated with the second user, and the first stream with area 410 provides the stream to the first client device associated with the first user, the second client device associated with the second user, and the third client device associated with the third user.

In other embodiments, content stream program 110 operates on a request handling device connected to a router in a specific location, such as, personal residence or office building. Content stream program 110 analyzes outgoing content requests and incoming responses for the request, while accounting for various security considerations. For example, a user of content stream program 110 can pre-negotiate what types of content can be analyzed to maintain security and privacy of the user. Content stream program 110 utilizes the request handling device as a proxy to deliver content request to the content providers on behalf of multiple end users with multiple client devices. For all outgoing requests that content stream program 110 is authorized to analyze, content stream program 110 identifies duplicate request for the same content. For example, if content stream program 110 determined both user A and user B are requesting similar content from a similar content provider, content stream program 110 blocks one of the requests from passing to the external network to the service provider and only streams the content once into the request handling device. Content stream program 110 distributes the content from the request handling device to both end users (i.e., user A and user B) via two data streams on the local network, thus allowing the contents to be streamed only once on the external network saving time and reducing external network bandwidth.

For streaming of live content, the proxy (i.e., request handling device) tracks the content requests in progress by utilizing URL metadata and/or packetized content checksums, as examples. In one example, user A is attending a web meeting with their team and for this web meeting, a request exists in the proxy. As user B joins the web meeting on the same local network, content stream program 110 queries a list of current content requests in progress and matches user B to the web meeting with user A and content stream program 110 sends content of the web meeting to both user A and user B from a single stream from the external network but through two separate streams on the same local network. Contents from the different streams carried within individual packets can be referred to with a newly proposed protocol named as a Packet Content Delivery Protocol (PCDP). Content stream program 110 compares each packet from different streams utilizing the md5summer checksum algorithm (or an alternative algorithm) to verify the commonality of the contents. As the packets declare having a common checksum, content stream program 110 declares the packets as having the same content and performs the above mentioned method to utilize a single stream on the external network for multiple data streams on the local network.

Figure 5:
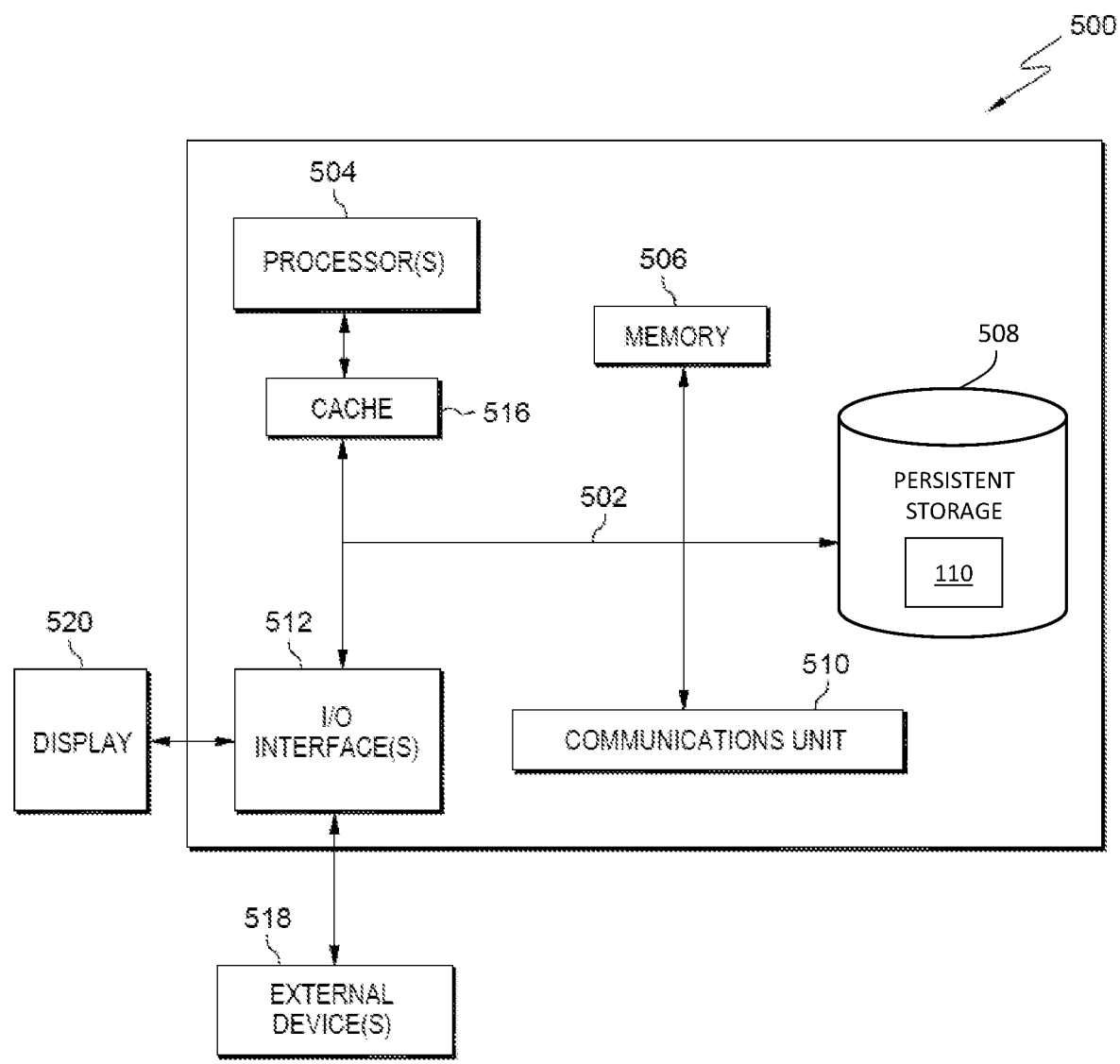
FIG. 5 is a block diagram of components of a computer system, such as the request handling device of FIG. 1, in accordance with an embodiment of the present invention.

FIG. 5 depicts computer system 500, where request handling device 104 is an example of a computer system 500 that includes content stream program 110. The computer system includes processors 504, cache 516, memory 506, persistent storage 508, communications unit 510, input/output (I/O) interface(s) 512 and communications fabric 502. Communications fabric 502 provides communications between cache 516, memory 506, persistent storage 508, communications unit 510, and input/output (I/O) interface(s)

512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of processors 504 by holding recently accessed data, and data near recently accessed data, from memory 506.

Program instructions and data used to practice embodiments of the present invention may be stored in persistent storage 508 and in memory 506 for execution by one or more of the respective processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to each computer system. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
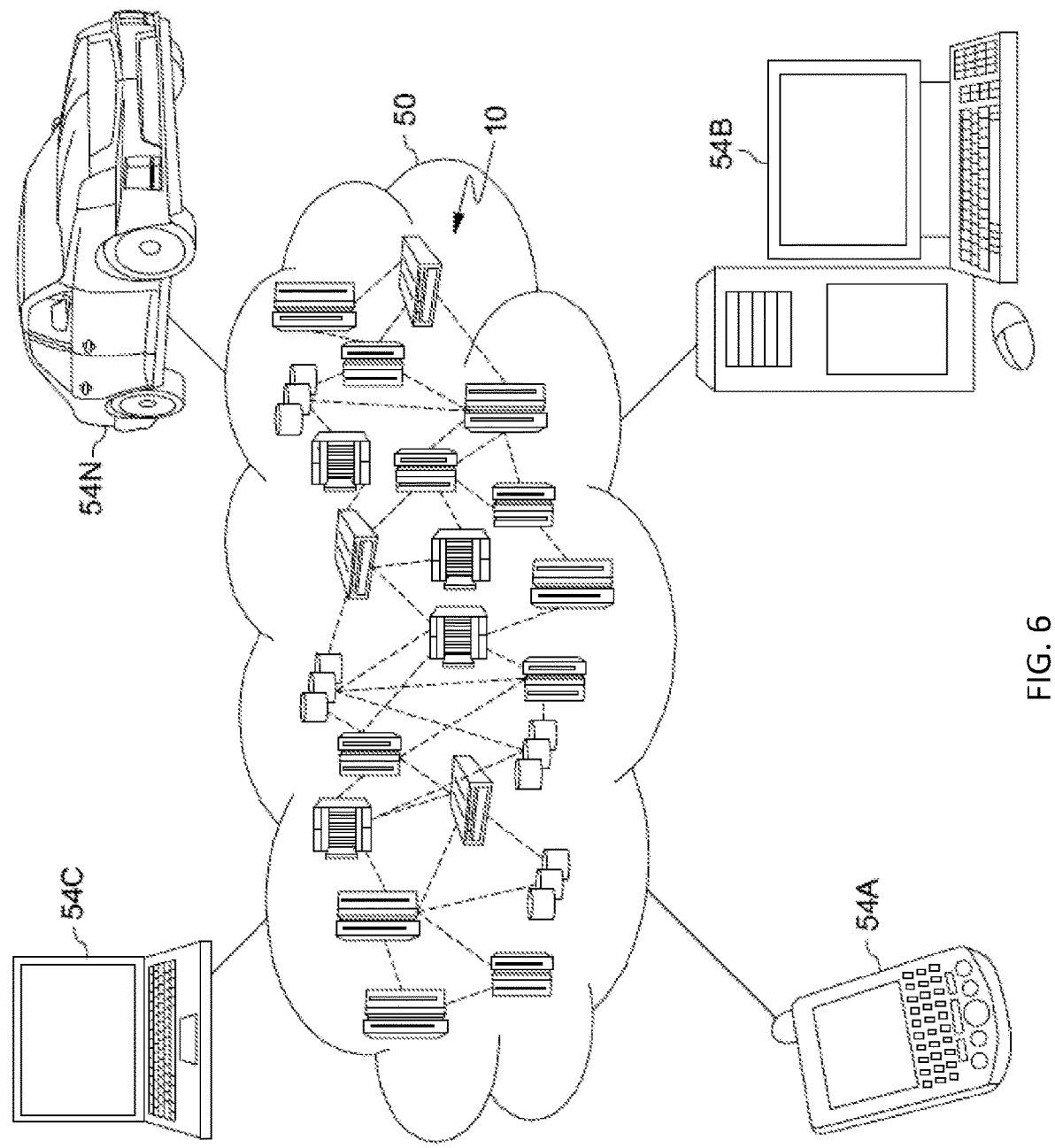
FIG. 6 depicts a cloud computing environment, in accordance with an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
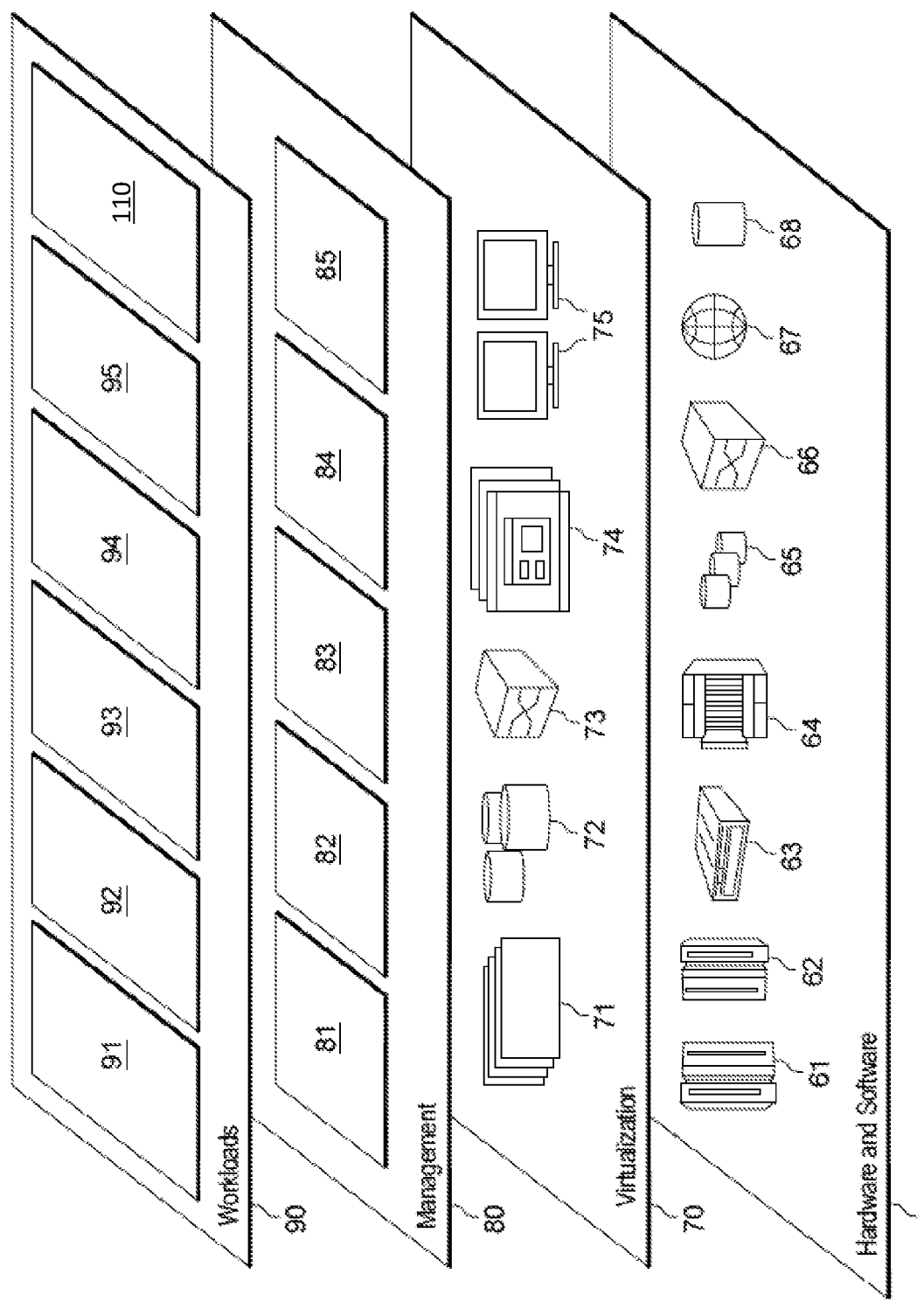
FIG. 7 depicts abstraction model layers, in accordance with an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content stream program 110.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   receiving, by a request handling device, a new request for content from a server provider;
   responsive to determining there is an existing request associated with an existing data stream for the content from the server provider, blocking, by the request handling device, the new request for the content from a service provider;
   receiving, by the request handling device, the existing data stream from the service provider for the content via an external network;
   performing, by the request handling device, a stream computation for the existing data stream to provide a first data stream for the existing request for the content and a second data stream for the new request for the content; and
   sending, by the request handling device, the first data stream for the existing request for the content to a first client device and the second data stream for the new request for the content to a second client device, via a local network.

2. The computer-implemented method of claim 1, further comprising:
   determining, by the request handling device, whether to analyze the new request for the content from the service provider based on security considerations that include one or more previously established user rules and preferences; and
   responsive to determining to analyze the new request for the content from the service provider, analyzing, by the request handling device, the new request for the content to identify the first client device associated with the new request, a type of content associated with the new request, and the content provider associated with the new request.

3. The computer-implemented method of claim 1, further comprising:
   determining, by the request handling device, whether there were multiple requests associated with the existing data stream for the content from the server provider; and
   responsive to determining there were multiple requests associated with the existing data stream, determining, by the request handling device, to perform a stream computation for the multiple requests associated with the existing data stream, wherein the multiple requests include the existing request for the content and the new request for the content.

4. The computer-implemented method of claim 1, wherein a portion of the first data stream overlaps with the second data stream.

5. The computer-implemented method of claim 4, wherein a remaining portion of the first data stream does not overlap with the second data stream and a duration for the remaining portion is equal to a period of time between the existing request and the new request.

6. The computer-implemented method of claim 5, further comprising:
   receiving, by the request handling device, a new data stream from the service provider for the remaining portion of the first data stream that does not overlap with the second data stream via the external network; and
   sending, by the request handling device, the first data stream with the remaining portion via the local network, prior to sending the portion of the first data stream that overlaps with the second data stream.

7. The computer-implemented method of claim 6, further comprising:
   subsequent to sending the first data stream with the remaining portion via the local network, severing, by the request handling device, the new data stream with the service provider via the external network.

8. A computer program product comprising:
   one or more computer-readable storage media and program instructions stored on the one or more computer-readable storage media capable of performing a method, the method comprising:
   receiving a new request for content from a server provider;
   responsive to determining there is an existing request associated with an existing data stream for the content from the server provider, blocking the new request for the content from a service provider;
   receiving the existing data stream from the service provider for the content via an external network;
   performing a stream computation for the existing data stream to provide a first data stream for the existing request for the content and a second data stream for the new request for the content; and
   sending the first data stream for the existing request for the content to a first client device and the second data stream for the new request for the content to a second client device, via a local network.

9. The computer program product of claim 8, further comprising:
   determining whether to analyze the new request for the content from the service provider based on security considerations that include one or more previously established user rules and preferences; and
   responsive to determining to analyze the new request for the content from the service provider, analyzing the new request for the content to identify the first client device associated with the new request, a type of content associated with the new request, and the content provider associated with the new request.

10. The computer program product of claim 8, further comprising:
    determining whether there were multiple requests associated with the existing data stream for the content from the server provider; and
    responsive to determining there were multiple requests associated with the existing data stream, determining to perform a stream computation for the multiple requests associated with the existing data stream, wherein the multiple requests include the existing request for the content and the new request for the content.

11. The computer program product of claim 8, wherein a portion of the first data stream overlaps with the second data stream.

12. The computer program product of claim 11, wherein a remaining portion of the first data stream does not overlap with the second data stream and a duration for the remaining portion is equal to a period of time between the existing request and the new request.

13. The computer program product of claim 12, further comprising:
    receiving a new data stream from the service provider for the remaining portion of the first data stream that does not overlap with the second data stream via the external network; and
    sending the first data stream with the remaining portion via the local network, prior to sending the portion of the first data stream that overlaps with the second data stream.

14. The computer program product of claim 13, further comprising:
    subsequent to sending the first data stream with the remaining portion via the local network, severing the new data stream with the service provider via the external network.

15. A computer system comprising:
    one or more computer-readable storage media and program instructions stored on the one or more computer-readable storage media capable of performing a method, the method comprising:
    receiving a new request for content from a server provider;
    responsive to determining there is an existing request associated with an existing data stream for the content from the server provider, blocking the new request for the content from a service provider;
    receiving the existing data stream from the service provider for the content via an external network;
    performing a stream computation for the existing data stream to provide a first data stream for the existing request for the content and a second data stream for the new request for the content; and
    sending the first data stream for the existing request for the content to a first client device and the second data stream for the new request for the content to a second client device, via a local network.

16. The computer system of claim 15, further comprising:
    determining whether to analyze the new request for the content from the service provider based on security considerations that include one or more previously established user rules and preferences; and responsive to determining to analyze the new request for the content from the service provider, analyzing the new request for the content to identify the first client device associated with the new request, a type of content associated with the new request, and the content provider associated with the new request.

17. The computer system of claim 15, further comprising:

determining whether there were multiple requests associated with the existing data stream for the content from the server provider; and responsive to determining there were multiple requests associated with the existing data stream, determining to perform a stream computation for the multiple requests associated with the existing data stream, wherein the multiple requests include the existing request for the content and the new request for the content.

18. The computer system of claim 15, wherein a portion of the first data stream overlaps with the second data stream.

19. The computer system of claim 11, wherein a remaining portion of the first data stream does not overlap with the second data stream and a duration for the remaining portion is equal to a period of time between the existing request and the new request.

20. The computer system of claim 19, further comprising:

receiving a new data stream from the service provider for the remaining portion of the first data stream that does not overlap with the second data stream via the external network; and sending the first data stream with the remaining portion via the local network, prior to sending the portion of the first data stream that overlaps with the second data stream.

* * * * *